(No Model.)
J. T. GRAVES.
HORSE POWER.
No. 259,849. Patented June 20, 1882.
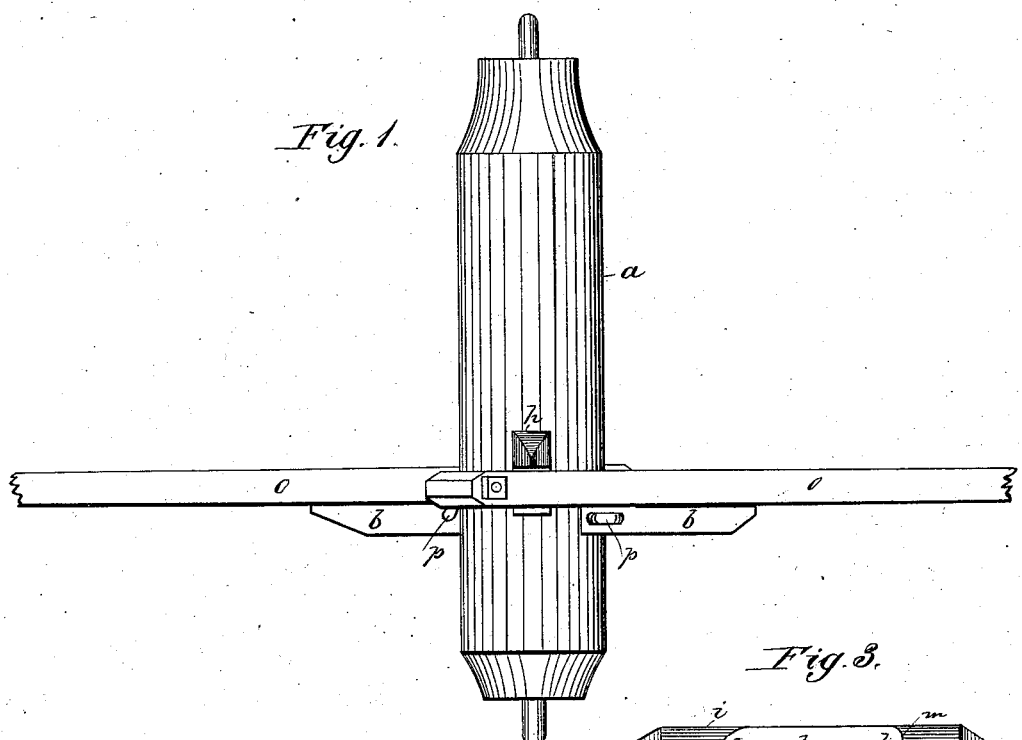
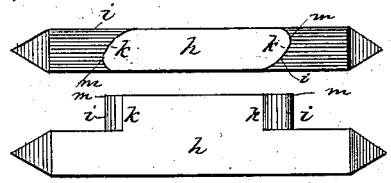
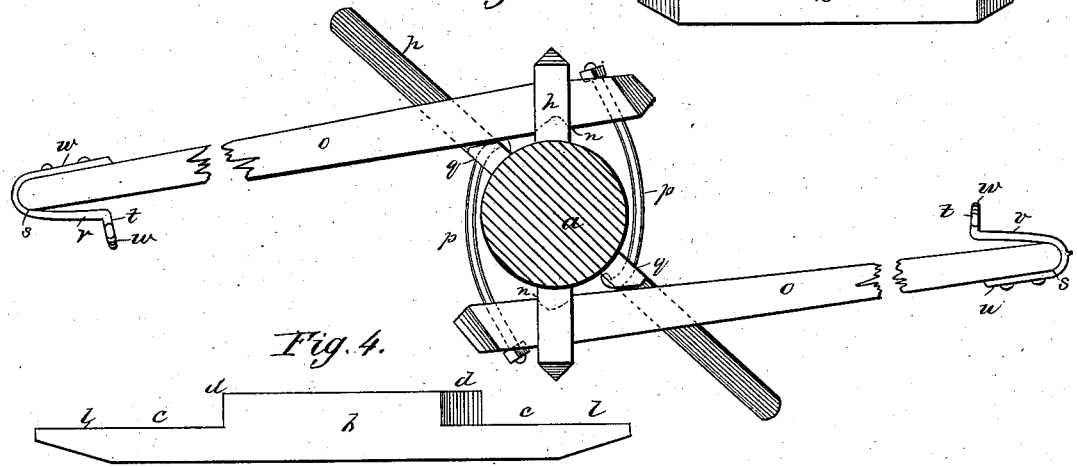
WITNESSES:
W. W. Hollingsworth
F. Read
INVENTOR:
Jas. T. Graves
BY
ATTORNEYS.

UNITED STATES PATENT OFFICE.

JAMES T. GRAVES, OF WILSON, NORTH CAROLINA.

HORSE-POWER.

SPECIFICATION forming part of Letters Patent No. 259,849, dated June 20, 1882.

Application filed May 3, 1882. (No model.)

*To all whom it may concern:*

Be it known that I, JAMES THOMAS GRAVES, of Wilson, in the county of Wilson and State of North Carolina, have invented a new and Improved Horse-Power; and I do hereby declare that the following is a full, clear, and exact description of the same, reference being had to the accompanying drawings, forming part of this specification, in which—

Figure 1 is a front elevation of my improved horse-power. Fig. 2 is a plan view of the same, and Figs. 3 and 4 are detail views.

My invention relates to improvements in that class of horse-powers in which a vertical shaft is revolved by means of a series of horizontal levers passing diametrically through the shaft and operated by horses or other animals secured near the outer ends of the horizontal levers; and my invention consists, first, of devices whereby the horizontal levers are secured to the vertical shaft of the horse-power tangentially to the shaft, instead of passing centrally through it, thus enabling the animals secured to the outer ends of the tangential levers and moving in a circle to pull at right angles to the levers instead of obliquely; and a great advantage is thus attained over the construction in which the levers pass centrally through the shaft and the animals pull in an oblique direction to the levers, and more freedom is given to the animals in their work, and if a lever be broken it can be more readily replaced, and at the same time greater spring or play is given the levers.

My invention further consists of a bent draft-hook of a staple form, one leg of which is secured to the back face of one end of a lever, and thence passes around and in a recess in the end of the lever, and thence passes along and parallel with the front end of the lever inwardly, and is provided at its end with a draft-hook, whereby a leverage equal to the entire length of the lever is obtained, whereas in the ordinary construction the draft-hook is secured a foot or two from the outer end of the lever, to prevent the breaking or splitting of the lever, thereby losing that amount of leverage and consequent power.

In the accompanying drawings, *a* represents the vertical cylindrical shaft of my improved horse-power, provided with the arm *b*, passing diametrically through the shaft *a* and provided with the recesses *c* in its outer ends, terminating inwardly in the oppositely-beveled ends *d*, against which the levers rest in the operation of the machine.

*h* represents an arm passing diametrically through the vertical shaft *a* a short distance above the arm *b*, and provided with right-angular recesses *i i* at each end. The vertical sides *k* of the recesses *i i* in the ends of the arm *h* are both double beveled, so as to form in each a vertical ridge, *m*, adapted to engage with a notch, *n*, in the inner face of the lever *o* and hold the latter in place, the lower face of the lever *o* resting on the horizontal upper face, *l*, of the recess *c* of the arm *b*.

*p* represents a rod curved so as to conform with the outer curve of the shaft. The rod *p* is secured to the lever *o* near its inner end, and the opposite end of the curved rod *p* passes through a hole, *q*, near the inner end of the arm *b*, and the rod *p*, at its opposite end, is provided with a lug or projection to prevent the curved rod *p* from being drawn out of the hole *q*. By this construction the levers are tangentially secured to the vertical cylindrical shaft *a*, so that the animals hitched to the outer ends of the levers and moving in a circle of which the vertical shaft is the center are enabled to pull in lines at right angles to the levers in their circuitous course, and not obliquely thereto, as is the case when hitched to levers passing diametrically through the vertical shaft, and at the same time the levers have more play, the animal greater freedom of action, and if a lever breaks it can be more readily replaced.

*s* represents a notch or recess made in the end of each lever *o*.

*t* represents a draft-hook, the shank of which is made in the form of a staple, one leg of which, *u*, is flattened out and bolted to the back face of a lever, *o*, near its end. The leg *u* thence passes along the back face of the lever *o*, and passes into the notch *s* in the end of the lever, and the other leg, *v*, of the draft-hook *t* passes along parallel, or nearly so, with the front face of the lever *o*, and is provided with a catch, *w*, at its inner end, to which the animals are hitched.

The draft-hook heretofore has been applied about two feet, or thereabout, from the end of the lever, to prevent the breaking or splitting of the latter.

By my construction I prevent the liability of injury to the end of the lever, and greater leverage is obtained, the whole length of the lever being utilized.

What I claim as my invention is—

1. The combination, with the vertical shaft $a$, provided with the arms $b$, having recesses $c$ in their ends, terminating inwardly in the oppositely-beveled ends $d$, and arm $h$, provided with angular recesses $i\ i$, having ridges $m\ m$, of the lever $o$, provided with notch $n$ and curved rod $p$, substantially as described, and for the purpose set forth.

2. The combination, with the lever $o$, provided with notch $s$ in its outer end, of the draft-hook $t$, secured to the outer end of the lever, and provided with the legs $u\ v$ and catch $w$, substantially as described, and for the purpose set forth.

JAMES THOMAS GRAVES.

Witnesses:
B. H. BARDIN,
F. A. WOODARD.